3,016,368
SULFONATED FLUOROCARBON COPOLYMER
George A. Gallagher, Media, Pa., assignor to E. I. du Pont de Nemours and Company, Wilmington, Del., a corporation of Delaware
No Drawing. Filed Aug. 22, 1960, Ser. No. 50,826
4 Claims. (Cl. 260—79.3)

This invention is directed to curable plastic, sulfonated fluorocarbon copolymers.

More specifically, the present invention is directed to a curable plastic sulfonated fluorocarbon copolymer made by subjecting a copolymer containing 30–70% by weight vinylidene fluoride monomer units, the remainder being hexafluoropropene monomer units, to the action of chlorosulfonic acid or fluorosulfonic acid or liquid sulfur trioxoide or a mixture of concentrated sulfuric acid and sulfur trioxide.

The copolymers of vinylidene fluoride and hexafluoropropene, which can be used in the present invention, are described in "Industrial and Engineering Chemistry," vol. 49, p. 1687 (1957), French Patent 1,153,164, Italian Patent 553,285, and British patent specification 789,786. A representative copolymer contains 60 weight percent vinylidene fluoride and has an inherent viscosity (0.1 gram copolymer in 100 cc. of an 87/13 weight percent tetrahydrofuran/dimethyl formamide mixture at 30° C.) of 0.95±0.05, a Mooney viscosity (ML at 100° C.) of 75±6, and a number-average molecular weight of about 100,000. Another representative copolymer contains 60 weight percent vinylidene fluoride and has an inherent viscosity of 1.75±0.15, a Mooney viscosity of 170±10, and a number-average molecular weight of about 200,000.

The dimensions of the copolymer are not critical. Frequently it is treated in the form of crumbs about 0.13 to 0.25 inch in diameter or, preferably, as chips 1.5 x 0.25 x 0.25 inch.

In order to prepare the sulfonated copolymer, the vinylidene fluoride/hexafluoropropene copolymer is heated with chlorosulfonic acid or fluorosulfonic acid or stabilized liquid sulfur trioxide or fuming sulfuric acid (commonly known as "oleum"). Although the fuming sulfuric acid can contain any proportion of $SO_3$, it is preferred that 20 to 30 parts of $SO_3$ be present for every 100 parts by weight of the $H_2SO_4$. Atmospheric or super-atmospheric pressure can be employed. The temperature can range from about 40° C. to about 100° C. The reaction is inconveniently slow at temperatures below 40° C. Temperatures above 100° C. are possible but the risk of undue product degradation is increased. Temperatures between about 70 and 100° C. are generally preferred.

The proportions of reactants are not critical. If insufficient sulfonating agent is supplied, some of the copolymer will be recovered unreacted. This residue can be converted to product by reaction with more sulfonating agent. Frequently, the weight of sulfonating agent is about 2 to 25 times that of the copolymer. The progress of the reaction can be followed visually by observing the formation of the insoluble flakes of sulfonated copolymer and the gradual disappearance of the original insoluble copolymer. The flakes themselves undergo sulfonation. Analysis of the whole copolymer or, preferably, the flakes of copolymer for sulfur content, is one method for determining the extent of reaction. Representative products have about 0.25–5% sulfur. The inherent viscosity decreases as the sulfonation proceeds; in typical runs, the value has fallen from 1.65 to 0.19 and from 0.91 to 0.53. Those skilled in the art can readily determine what sulfur content and what inherent viscosity should be attained in order to have a copolymer particularly suitable for a specific end use. Continued exposure of the sulfonated fluorocarbon copolymer to excess sulfonating agent ultimately yields a very low molecular weight completely degraded product.

The reaction time required will depend on the type of product desired. Higher sulfur contents and lower inherent viscosities require more time. For a particular product, the higher the reaction temperature, the shorter the reaction time needed. A representative time, when chlorosulfonic acid is used, is 3–5 hours at 70° C.

No solvent is needed to practice the invention. The reaction is carried out by contacting the copolymer with the sulfonating agent in which it is insoluble. The sulfonated copolymer flakes off exposing fresh surface. The reaction is quenched by pouring the mass at or around room temperature onto crushed ice and then washing with water until acid-free.

The sulfonated copolymer of the present invention can be cured by the procedures known in the art for curing sulfochlorinated polyhydrocarbons or carboxyl group substituted polymers (e.g., "Hycar" 1072 carboxylic nitrile rubber). Typical details are given in U.S. Patents 2,416,061, 2,586,363, 2,646,422, and 2,879,261. The following publications may also be consulted: Introduction to Rubber Technology, Ed. by M. Morton, Reinhold Pub. Co., N.Y., 1959, pp. 350–353; Report No. 56–4, "Hypalon 20 Principles of Compounding and Processing," B. W. Fuller, Elastomers Division, E. I. du Pont de Nemours & Co. (Inc.), Wilmington, Delaware, Sept. 1956; Report No. 58–4 "New Curing Systems for 'Hypalon' 20," J. B. Knox and J. Becker, Elastomer Chemicals Department, E. I. du Pont de Nemours & Co. (Inc.), Wilmington, Delaware, May 1958; Information Bulletin, "'Hypalon' Chlorosulfonated Polyethylene, Properties and Processing Techniques," Polychemicals Department, E. I. du Pont de Nemours & Co. (Inc.), Wilmington, Delaware; "Properties of 'Hycar' 1072—a carboxylic nitrile rubber," C. H. Lufter and N. G. Duke, Chemical & Engineering Data Series, vol 3, pp. 297–304 (1958). In any case, enough of a metallic oxide (such as magnesium oxide or litharge) is supplied to neutralize all the acid present and to crosslink the copolymer chains. In representative examples, 15 parts by weight of magnesium oxide (optionally in combination with about 1.0 part of hexamethylenediamine carbamate) may be compounded with 100 parts by weight of a copolymer having a sulfur content of 0.28% and heated for ½ hour at 150° C. in a press.

Prior to curing, the sulfonated copolymer can be compounded with conventional fillers and reinforcing agents. Frequent concentrations fall within the range of 10 to 60 parts per 100 parts of copolymer by weight. The concentration selected will depend upon the degree of hardness, heat resistance and stability in general desired in the cured product. The carbon blacks may be those normally used in elastomers; examples include thermal, furnace, and channel blacks. Mineral fillers, which can be used, include the fine silicas, clays and diatomaceous earth. Pigments can be incorporated for color effects.

It is a particularly valuable feature of the present invention that cured copolymer stock can be used as well as raw stock to prepare the curable plastic sulfonated copolymers. This development permits one to utilize vulcanizate scrap, thereby effecting desirable cost-savings in the fabrication of O-ring seals and other useful articles. The booklet "Report No. 58–3 Viton A and Viton A-HV" by A. L. Moran and T. D. Eubank, Elastomer Chemicals Department, E. I. du Pont de Nemours and Co. (Inc.), Wilmington 98, Delaware, May 1958, describes typical procedures for making suitable cured copolymer stocks.

Representative examples illustrating the present invention are as follows. In these examples, the inherent viscosities were measured for solutions of 0.10 gram of copolymer in 100 milliliters of an 87/13 weight percent tetrahydrofuran/dimethyl formamide mixture at 30° C.

$VF_2$=vinylidene fluoride  HFP=hexafluoropropene

EXAMPLE 1

In a 100-cc. round-bottom glass reaction flask fitted with a reflux condenser were mixed 4.35 grams of a 64/36 wt. percent $VF_2$/HFP copolymer (inherent viscosity=1.65) and 50 cc. of chlorosulfonic acid at atmospheric pressure. They were heated to 70° C. over a period of three hours and were held at 70° C. for an additional period of three hours. After being cooled to room temperature, the reaction mixture was poured over cracked ice and filtered to remove the solids present. A solid piece of unreacted copolymer (2.8 grams) and a considerable amount of flocculent sulfonated copolymer were separated. The latter, after it was washed acid-free and dried in a 50° C. vacuum oven, weighed 1.3 grams, had a sulfur content of 3.0% and an inherent viscosity of 0.19. This sulfonated copolymer was soluble in acetone. When heated on a hot plate at 200° C., however, it became crosslinked as evidenced by lack of solubility when placed in acetone. When an acetone solution of the uncrosslinked sulfonated copolymer was poured into water and the acetone evaporated, the copolymer stayed in solution. Unmodified copolymer was immediately coagulated when its acetone solution was poured into water.

EXAMPLE 2

Fifty grams of a 60/40 wt. percent $VF_2$/HFP copolymer crumbs 0.13–0.25 inch in diameter (inherent viscosity=0.98) were heated to 100° C. with 100 cc. of 20% oleum in a 250 cc. round-bottom glass reaction flask at atmospheric pressure, over a one-hour period and maintained at 100° C. thereafter for three hours. The reaction mixture was then dumped on ice and filtered. The solid product obtained was washed with 400 cc. portions of water until acid-free. The 40 grams of air-dried material obtained were dissolved in 150 cc. of acetone, and the solution obtained was poured with stirring into 800 cc. of deionized water. The precipitated sulfonated copolymer was again washed acid-free by decantation. After drying in a 50° C. vacuum oven for 24 hours, the copolymer weighed 28 grams and had a sulfur content of 0.28% and an inherent viscosity of 0.86.

Thirteen grams of the above sulfonated copolymer were mixed on a standard 2" x 6" rubber mill with 1.95 grams of magnesium oxide. 2.45 grams of the mixture were heated in a slab mold for 30 minutes at 150° C. to give a well-formed slab which was rubbery and insoluble in acetone.

To the other 11.5 grams of the sulfonated copolymer-magnesium oxide mixture were added 1.8 grams of medium thermal black and 0.1 gram of hexamethylenediamine carbamate. After this mixture had been cured in a press for 30 minutes at 150° C., it was then cured in a circulating air oven for 1 hour at 100° C., 1 hour at 140° C., and 24 hours at 204° C. A rubbery slab formed which (at 25° C.) had a tensile at the break of 1,250 pounds/square inch, an elongation at the break of 300%, and a modulus at 100% extension of 350 pounds/square inch.

EXAMPLE 3

49.5 grams of a 60/40 wt. percent $VF_2$/HFP copolymer in the form of chips approximately 1.5" x .25" x .25" (inherent viscosity=1.95) were combined with 100 cc. of chlorosulfonic acid in a 250 cc. round-bottom glass reaction flask fitted with a reflux condenser. It was heated to 70° C. over a period of ¾ of an hour and was then held at 70±5° C. for 2¼ hours. After being cooled to room temperature, the mixture was poured into approximately 1,000 grams of ice and the solid pieces of unreacted copolymer separated from the light flocculent sulfonated copolymer product. These fractions were washed individually with 200 cc. portions of deionized water in a Waring Blendor until acid-free and were then dried in a 50° C. vacuum oven for 48 hours. After the sulfonated copolymer (7.55 grams) had been dissolved in acetone to remove a small amount of gelled material, the acetone was evaporated to give 6.33 grams of product having a sulfur content of 3.5% and an inherent viscosity of 0.54. The recovered unreacted copolymer weighed 43.4 grams.

Five grams of the sulfonated copolymer were mixed on a standard 2" x 6" rubber mill with 0.75 gram of magnesium oxide. After it had been molded for 30 minutes at 150° C. in a press, it yielded a stiff plastic material which was no longer soluble in acetone.

EXAMPLE 4

The procedure of Example 3 was repeated using a 60/40 wt. percent $VF_2$/HFP copolymer with an inherent viscosity of 0.91. Heating time to 70°±5° C. took 35 minutes and the reaction mixture was held there for a total of 3 hours. It was worked up the same way as previously described in Example 3. 1.35 grams of acetone-soluble sulfonated copolymer were obtained with a sulfur content of 3.0% and an inherent viscosity of 0.53. The unreacted copolymer weighed 49.7 grams.

EXAMPLE 5

Fifty grams of 60/40 wt. percent $VF_2$/HFP copolymer with an inherent viscosity of 1.04 in the form of crumbs having particle sizes ranging from 1–3 mm. in diameter were heated with 100 cc. of chlorosulfonic acid in a 250 cc. round-bottom glass reaction flask fitted with reflux condenser. One hour was required to heat to 70±5° C.; the mixture was held at 70±5° C. afterward for one hour. After the mixture had been cooled to room temperature, it was quenched with ice and the sulfonated copolymer recovered by filtration. After it had been washed acid-free with 200 cc. portions of deionized water in a Waring Blendor, the product was dried overnight in a 50° C. vacuum oven and blended on a 2" x 6" laboratory mill. It weighed 42.4 grams, had an inherent viscosity of 1.16, a sulfur content of 0.5%, and a chlorine content of 0.15%.

15 grams of the above product were mixed on a 2" x 6" laboratory mill with 2.25 g. of magnesium oxide and heated for 30 minutes at 150° C. in a slab mold under 20,000 lbs. pressure. A well-formed, rubber slab was obtained which was insoluble in acetone.

A control using unsulfonated copolymer could not be removed from the mold without tearing and was completely soluble in acetone.

EXAMPLE 6

The unreacted copolymer from Example 3 was mixed with 100 cc. of chlorosulfonic acid in a 500-cc. round-bottom glass reaction flask fitted with a reflux condenser. It was heated to 70±10° C. over a period of 30 minutes and then was allowed to cool slowly to room temperature. The sulfonation was quenched by adding the reaction mixture to 1,000 grams of ice. After the copolymer was recovered by filtration, it was washed in a Waring Blendor with 200-cc. portions of deionized water until acid free. The product was then dissolved in 75 cc. of acetone and filtered to remove a small amount of crosslinked copolymer. After evaporation of the acetone, 4.8 grams of sulfonated copolymer were obtained with an inherent viscosity of 0.24, a sulfur content of 3.1%, and a chlorine content of 1.7%.

EXAMPLE 7

*Preparation of sulfonated copolymer from cured stock*

(A) 31.7 grams of a vulcanizate (made by mixing 100 parts of a 60/40 wt. percent $VF_2$/HFP copolymer having an inherent viscosity of 0.95, 15 parts of MgO, 18 parts of medium thermal black and 1 part of hexamethylenediamine carbamate on a rubber mill, curing in a press for 30 minutes at 150° C. and in an oven for 1 hour at 100° C., 1 hour at 140° C. and 20 hours at 204° C.) were cut into pieces 0.25" x 0.25" x .075", and combined with 90 cc. of ClSO₃H in a 500-cc. round-bottom flask fitted with a thermowell and water-cooled condenser.

The mixture was heated to 70° C. over a period of ½ hour. By that time an acidic gas was being evolved from the reaction mixture. The mixture was maintained at 68–76° C. for 2 hours and was then allowed to cool to room temperature.

After the reaction mixture had been poured into 1000 g. of ice, the aqueous suspension of loose flocculent sulfonated copolymer was decanted from the unreacted vulcanizate and poured through filter cloth. The remaining product which adhered to the pieces of vulcanizate was removed by agitating them twice at high speed in a blendor with 200 cc. of deionized water.

After the combined product had been washed three times with 200-cc. portions of water, it was air-dried and finally placed in a vacuum oven overnight at 50° C. The recovered vulcanizate was dried in the same manner. 5.0 grams of flocculent product and 35.2 g. of recovered vulcanizate were obtained.

(B) The sulfonated polymer is separated from the carbon black and inorganic compounds by dissolving the former in acetone. For example, when 2.0 g. of the flocculent material was extracted with 15 cc. of acetone and the acetone evaporated, 1.0 g. of a rubbery copolymer having an inherent viscosity of .18 and 2.7% sulfur was obtained which had all of the characteristics of the product obtained by the treatment of raw copolymer. It was substantially acetone-soluble and water-insoluble, yet is obtained as a water solution by first dissolving in acetone, mixing with water and then evaporating off the acetone. It is deposited as a thin polymeric film on a substrate merely by allowing the water to evaporate.

(C) The flocculent product made in preceding Part A is cured directly by merely heating it in a press. When a portion of it was heated between two pieces of aluminum at 150° C. in a press for 2 minutes at 10,000 lbs. pressure, a cured film was obtained which film was substantially insoluble in acetone.

It is understood that the preceding examples may be varied as to copolymer compositions, reaction conditions, and sulfonating agents to produce essentially the same results. Other variations and modifications within the scope of one skilled in the art are also contemplated.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A curable plastic sulfonated fluorocarbon copolymer made by subjecting a copolymer containing 30 to 70% by weight vinylidene fluoride monomer units, the remainder of said copolymer consisting of hexafluoropropene monomer units, to the action of a sulfonating agent taken from the group consisting of chlorosulfonic acid, fluorosulfonic acid, liquid sulfur trioxide, and a mixture of concentrated sulfuric acid and sulfur trioxide.

2. A water solution of the curable plastic sulfonated fluorocarbon copolymer of claim 1.

3. An acetone solution of the curable plastic sulfonated fluorocarbon copolymer of claim 1.

4. A sulfonated fluorocarbon copolymer according to claim 1, which copolymer is cured.

No references cited.